US012654182B2

(12) United States Patent
Wang et al.

(10) Patent No.: US 12,654,182 B2
(45) Date of Patent: Jun. 16, 2026

(54) HYDRAULICALLY BALANCED WATER-STOP SWITCH MECHANISM AND SHOWER HEAD HAVING SAME

(71) Applicant: XIAMEN DELMEI SANITARY WARE CO., LTD., Xiamen (CN)

(72) Inventors: Chunhua Wang, Xiamen (CN); Guiyun Zhang, Xingren (CN); Yongqiang Yan, Fuzhou (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 415 days.

(21) Appl. No.: 18/329,591

(22) Filed: Jun. 6, 2023

(65) Prior Publication Data

US 2024/0408624 A1 Dec. 12, 2024

(51) Int. Cl.
*B05B 1/30* (2006.01)
*B05B 1/18* (2006.01)

(52) U.S. Cl.
CPC .............. *B05B 1/3013* (2013.01); *B05B 1/18* (2013.01)

(58) Field of Classification Search
CPC ....... B05B 1/3013; B05B 1/18; B05B 1/3026; E03C 1/0408
See application file for complete search history.

(56) References Cited

U.S. PATENT DOCUMENTS 11,473,484 B2 * 10/2022 Perotto .................... F01M 1/08
2018/0001331 A1 * 1/2018 Lin ....................... E03C 1/0409
2019/0255552 A1 * 8/2019 Huang .................... B05B 15/50

* cited by examiner

*Primary Examiner* — Qingzhang Zhou

(57) ABSTRACT

A hydraulically balanced water-stop switch mechanism includes a water passage pipe, a water passage is formed between an inner pipe and an outer pipe of the water passage pipe. One end of the inner pipe is a closed end, and the other end is movably provided with a water-stop plug. A switch assembly is configured to cause movement of the water-stop plug. A chamber is formed between the water-stop plug and the closed end in the water passage pipe, and the chamber is provided with a ventilation hole. Preferably, the switch assembly includes a push rod, a automatic retractable and locking mechanism as applied in a ballpoint pen, and a elastic reset member for causing the water-stop plug to move toward the water outlet.

7 Claims, 7 Drawing Sheets

HYDRAULICALLY BALANCED WATER-STOP SWITCH MECHANISM AND SHOWER HEAD HAVING SAME

TECHNICAL FIELD

The present disclosure relates to the field of sanitary ware, in particular to a hydraulically balanced water-stop switch mechanism and a shower head having same.

BACKGROUND

Shower head is a bathroom device used for showering. The user can switch the outlet water on and off or adjust water temperature by operating the mixing valve. When the user needs to apply shower gel, shampoo, and so on during the shower, he/she usually needs to cut off the water supply of the shower head by operating the mixing valve, which will easily change the water temperature that has been set up well. In view of the above problem, a temporary water control structure integrated in the hand-held part of the shower head has emerged in the prior art, which usually uses two types of switch: push-button switch or press-button switch. However, the water-stop plug of the currently available temporary water-stop structure is easily affected by the water pressure, resulting in greater resistance to movement of the water-stop plug, and it is laborious to operate the switch and inconvenient to use.

SUMMARY

The present disclosure provides a hydraulically balanced water-stop switch mechanism and a shower head having same with the intent of addressing the above-mentioned problems existing in the prior art.

The present disclosure adopts the following technical solutions.

A hydraulically balanced water-stop switch mechanism includes a water-stop plug, a water passage pipe and a switch assembly, the water passage pipe includes an inner pipe and an outer pipe, the outer pipe is sleeved outside the inner pipe, and a water passage is formed between the outer pipe and the inner pipe. A first end of the outer pipe serves as a water inlet, a second end of the outer pipe serves as a water outlet; a first end of the inner pipe proximal to the water outlet is an open end, the water-stop plug is arranged inside the inner pipe and the water-stop plug is movable toward the water outlet. The switch assembly is configured to cause movement of the water-stop plug, a second end of the inner pipe proximal to the water inlet is a closed end, and a sealing ring is provided between the water-stop plug and the inner pipe to form a chamber between the water-stop plug and the closed end, and the chamber is provided with a ventilation hole.

Further, the inner pipe and the outer pipe are integrally formed as a single piece.

Further, two symmetrical water passages are formed between the inner pipe and the outer pipe at left and right sides.

Further, the switch assembly includes a push rod, an automatic retractable and locking mechanism as applied in a ballpoint pen, and an elastic reset member for causing the water-stop plug to move toward the water outlet. The water-stop plug is provided with a chute with a sloping surface, and the push rod is movable toward the chute to cause the water-stop plug to move in a direction away from the water outlet in the water passage pipe, and the automatic retractable and locking mechanism as applied in a ballpoint pen is configured to cause movement of the push rod.

Further, the water passage pipe is provided with a mounting part, the automatic retractable and locking mechanism as applied in a ballpoint pen includes a switch cap, an outer shell, a pressing rod, a locking member, and a second compression spring, the pressing rod, the locking member, and the second compression spring are arranged in sequence inside the outer shell; a first end of the outer shell is connected to the mounting part, the push rod is connected to the locking member, the switch cap is installed on a second end of the outer shell, and the switch cap is connected with the pressing rod.

Further, the outer shell includes a guiding cylinder and a cover plate, the cover plate is engaged with the guiding cylinder, and the guiding cylinder is engaged with the mounting part.

According to another aspect of the present disclosure, a shower head having water-stop switch mechanism is provided which includes a shower head main body and the water-stop switch mechanism with any one of structures as described above. The shower head main body is provided with a handle, and the water-stop switch mechanism is arranged inside the handle.

Further, the shower head further includes a connection pipe, the connection pipe is assembled inside the handle, a first end of the connection pipe communicates with the water inlet of the water passage pipe, and a second end of the connection pipe extends to the outside of the handle and is provided with a connection part.

Further, the shower head main body includes an upper decorative shell, a water outlet assembly and a lower decorative shell configured with the handle, the water outlet assembly is assembled between the upper decorative shell and the lower decorative shell, and the water outlet assembly communicates with the water outlet of the water passage pipe.

Further, the water outlet assembly includes a water sealing cover, a rubber plate with holes and a water outlet plate, the water sealing cover communicates with the water outlet of the water passage pipe, the rubber plate with holes is attached to the water outlet plate by glue, and the water sealing cover is sealed and connected to the water outlet plate to form a water chamber with a plurality of water outlet holes.

According to the above description of the present disclosure, the present disclosure has the following advantages.

First, in the present disclosure, water passage(s) is formed between the outer pipe and the inner pipe of the water passage pipe, specifically, the water passage(s) is formed between the outer sidewall of the inner pipe and the inner sidewall of the outer pipe, one end of the inner pipe is a closed end, and the other end of the inner pipe is movably and internally provided with a water-stop plug, and a switch assembly configured to cause movement of the water-stop plug is also provided. A chamber is formed between the rear end of the water-stop plug and the closed end in the water passage pipe, a sealing ring is provided between the water-stop plug and the inner pipe at the rear end of the water-stop plug, and the chamber is provided with a ventilation hole. The closed end and the sealing ring can isolate the rear end of the water-stop plug and the chamber from the water inlet, i.e. water flow cannot reach the chamber. With the provision of the ventilation hole, the rear end of the water-stop plug communicates with the atmospheric pressure, such that both the front and rear ends of the water-stop plug communicate with the atmospheric pressure, and two ends of the water-stop plug is hydraulically balanced. As a result, the water-stop plug is free from the resistance caused by unbalanced pressure at two ends during backward movement, and the operation of the switch assembly is more labor-saving.

Second, in the present disclosure, two symmetrical water passages are arranged in the water passage pipe, and the water pressure applied on the left and right sides of the water-stop plug is balanced, so that the water-stop plug can move more smoothly and unbiasedly.

Third, in the present disclosure, the outer shell of the automatic retractable and locking mechanism as applied in a ballpoint pen is engaged to the mounting part of the water passage pipe with a secure installation and easy assembling or disassembling.

DETAILED DESCRIPTION OF THE EMBODIMENTS

The specific embodiments of the present disclosure are described below with reference to the accompanying drawings.

Figure 1:
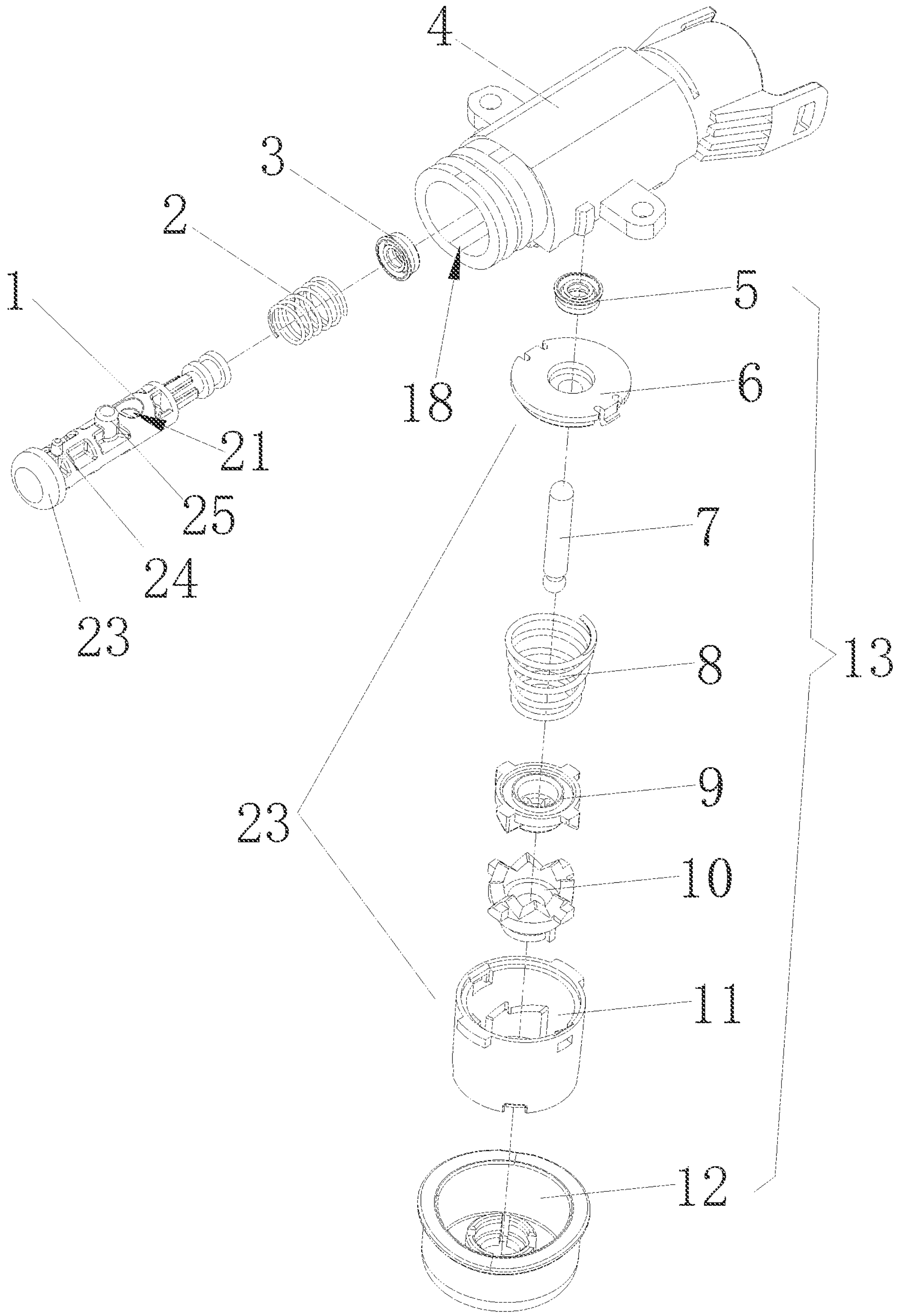
FIG. 1 is a first exploded view of a water-stop switch mechanism according to the present disclosure.
Figure 2:
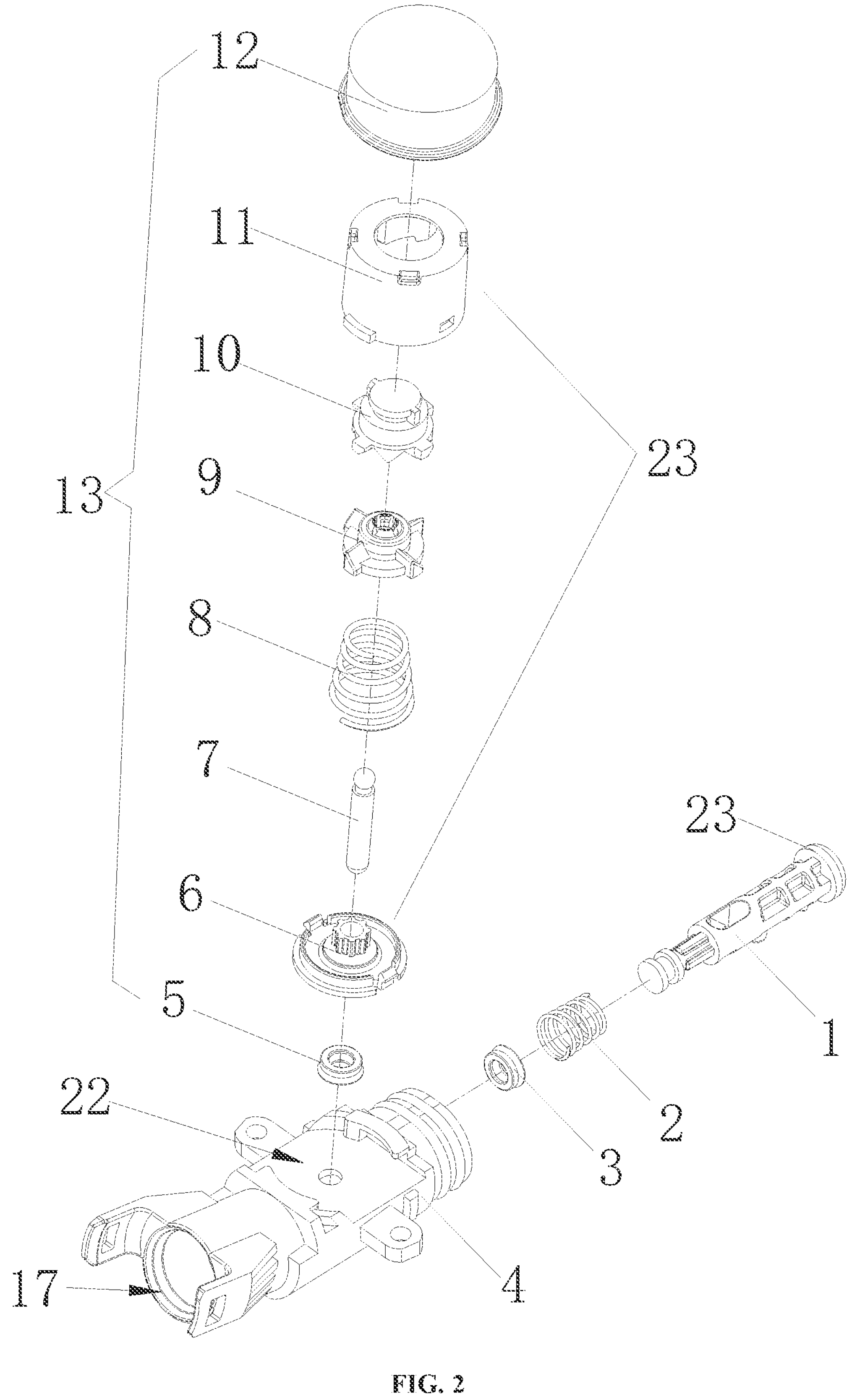
FIG. 2 is a second exploded view of the water-stop switch mechanism according to the present disclosure.
Figure 3:
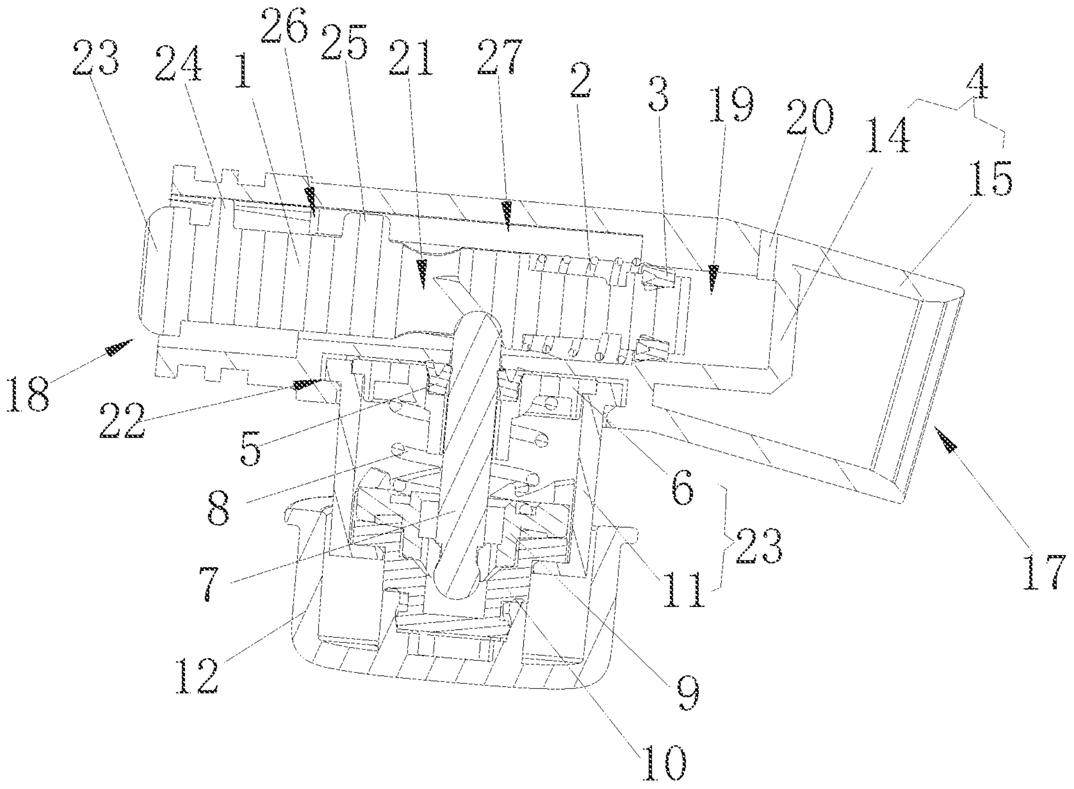
FIG. 3 is a cross-sectional view of the water-stop switch mechanism according to the present disclosure.
Figure 4:
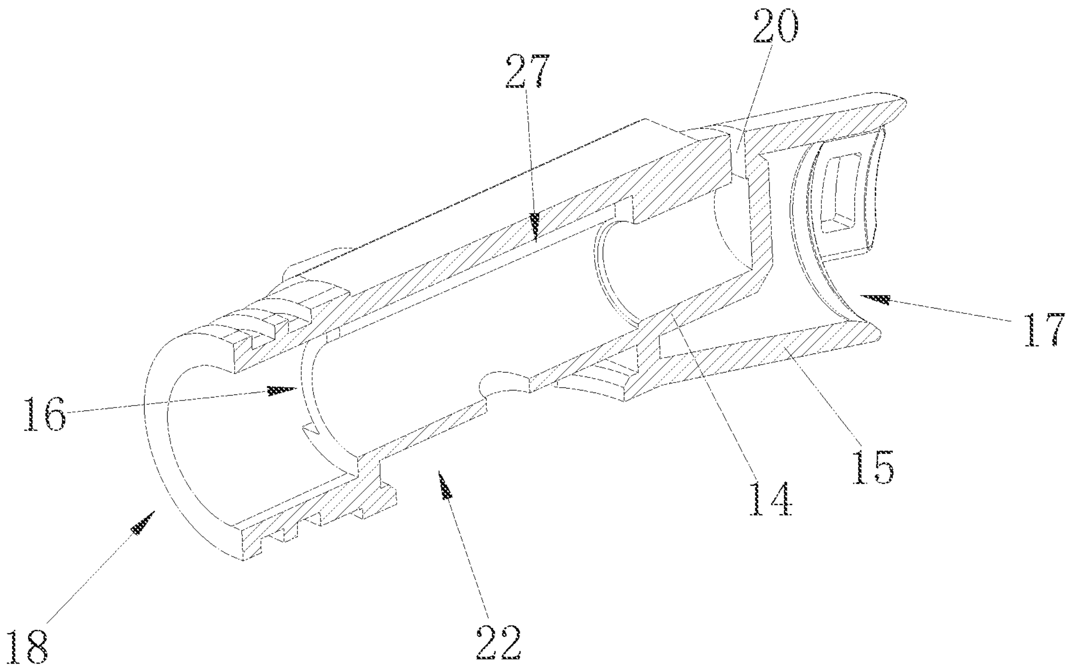
FIG. 4 is a first cross-sectional view of a water passage pipe according to the present disclosure.
Figure 5:
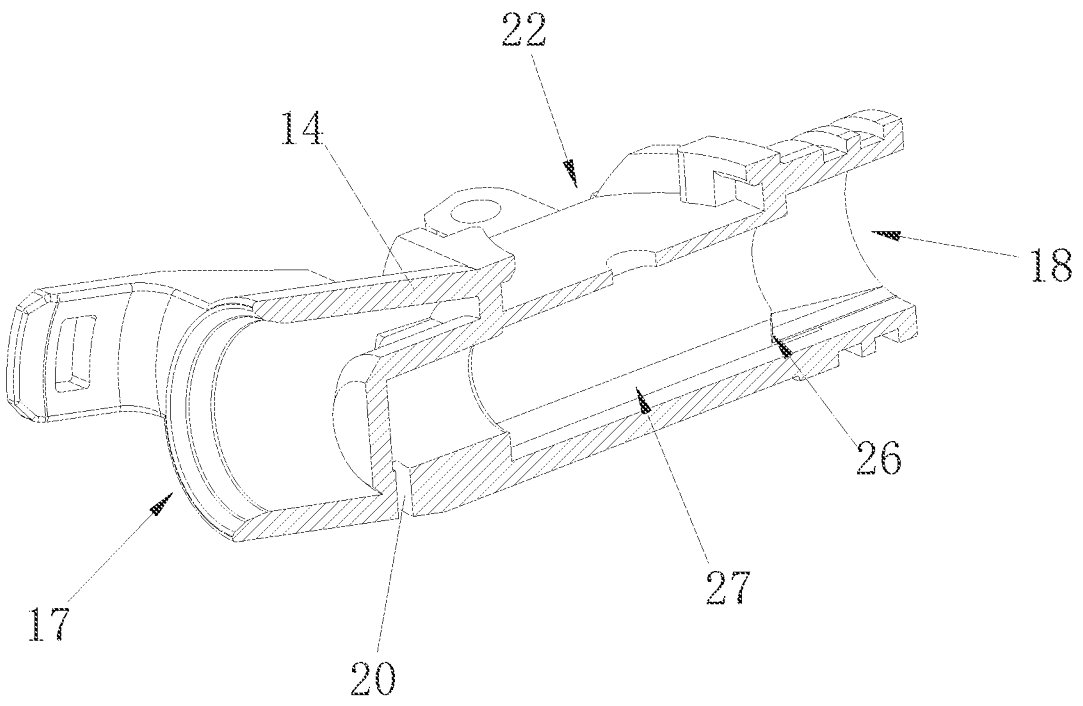
FIG. 5 is a second cross-sectional view of the water passage pipe according to the present disclosure.

As shown in FIGS. 1-5, a hydraulically balanced water-stop switch mechanism includes a water-stop plug 1, a water passage pipe 4 and a switch assembly. Specifically, the water passage pipe 4 includes an inner pipe 14 and an outer pipe 15, and the outer pipe 15 is sleeved outside the inner pipe 14. A water passage 16 is formed between the outer pipe 14 and the inner pipe 15. One end of the outer pipe 15 serves as a water inlet 17, and the other end of the outer pipe 15 serves as a water outlet 18. The water inlet 17 and the water outlet 18 are the water inlet and the water outlet of the water passage pipe 4. One end of the inner pipe 15 proximal to the water outlet 18 is an open end, and the other end of the inner pipe 15 proximal to the water inlet 17 is a closed end. A water-stop plug 1 is arranged inside the inner pipe and the water-stop plug 1 is movable toward the water outlet 18. A switch assembly is configured to cause movement of the water-stop plug 1.

As shown in FIGS. 1-5, according to one embodiment, the inner pipe 14 and the outer pipe 15 may be integrally formed as a single piece, or they may have other variations.

As shown in FIGS. 1-5, according to one embodiment, the inner pipe 14 and the outer pipe 15 are arranged coaxially.

Figure 9:
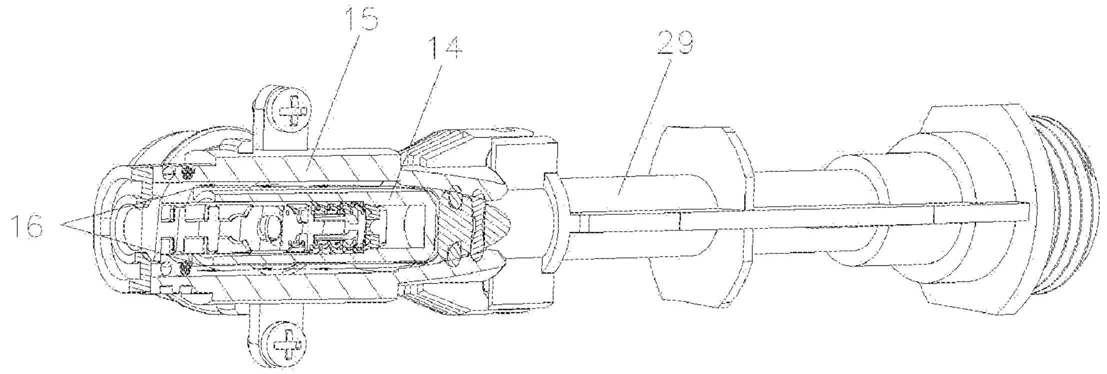
FIG. 9 is a cross-sectional view of the water-stop switch mechanism connecting with a connection pipe according to one embodiment of the present disclosure.

As shown in FIGS. 1-5 and 9, according to one embodiment, two symmetrical water passages 16 may be formed at left and right sides between the inner pipe 14 and the outer pipe 15, or the water passage may have other variations. The cross section of the water passage 16 is arc-shaped.

As shown in FIGS. 1-5, the end of the water-stop plug 1 proximal to the closed end is the rear end of the water-stop plug 1, and a sealing ring 3 is provided between the water-stop plug 1 and the inner pipe 14, so that water cannot flow to the chamber 19 formed between the rear end of the water-stop plug 1 and the closed end of the inner pipe 14. Further, the water passage pipe 4 is provided with a ventilation hole 20 at the chamber 19.

As shown in FIGS. 1-5, according to one embodiment, the cross section of the sealing ring 3 may have a Y shape or other variations.

As shown in FIGS. 1-5, in addition, the water-stop plug 1 is also provided with a plug head 23, a first position-limiting protrusion 24 configured to limit the travel distance and a second position-limiting protrusion 25 configured to limit the rotation of the water-stop plug 1. A step surface 26 matching with the first position-limiting protrusion 24 and a guide groove 27 matching with the second position-limiting protrusion 25 are provided inside the water passage pipe 4.

As shown in FIGS. 1-5, the above-mentioned switch assembly includes an elastic reset member, a push rod 7 and an automatic retractable and locking mechanism 13 as applied in a ballpoint pen. Specifically, the above-mentioned elastic reset member is configured to cause the water-stop plug 1 to move toward the water outlet 18. The elastic reset member may be, but is not limited to, a first compression spring 2, which is sleeved on the rear end of the water-stop plug 1. One end of the first compression spring 2 abuts against the stepped surface provided on the sidewall of the water-stop plug 1, and the other end of the first compression spring 2 abuts against a stepped surface provided on the inner sidewall of the inner pipe 14. Alternatively, the first compression spring 2 may also be arranged in the chamber 19, with one end abutted against the rear end of the water-stop plug 1 and the other end abutted against the closed end of the inner pipe 14.

As shown in FIGS. 1-5, the water-stop plug 1 is provided with a chute 21 with a sloping surface, and the push rod 7 can move toward the chute 21 to cause the water-stop plug 1 to move in a direction away from the water outlet 18 in the water passage pipe 4. The automatic retractable and locking mechanism 13 as applied in a ballpoint pen is configured to cause movement of the push rod 7.

As shown in FIGS. 1-5, according to one embodiment, the water passage pipe 4 is provided with a mounting part 22, and the automatic retractable and locking mechanism 13 as applied in a ballpoint pen includes a switch cap 12, an outer shell 23, a pressing rod 10, a locking member 9, and a second compression spring 8, the pressing rod 10, the locking member 9, and the second compression spring 8 are arranged in sequence inside the outer shell 23. Specifically, a first end of the outer shell 23 is connected to the mounting part 22, the push rod 7 passes through the outer shell 23 and is connected to the locking member 9, the switch cap 12 is installed on a second end of the outer shell 23, and the switch cap 12 is connected with the pressing rod 10.

As shown in FIGS. 1-5, specifically, the outer shell 23 includes a guiding cylinder 11 and a cover plate 6, the cover plate 6 is engaged with the guiding cylinder 11, and the guiding cylinder 11 is engaged with the mounting part 22.

Preferably, the guiding cylinder 11 is detachably engaged with the mounting part 22 by rotating the guiding cylinder 11 in place.

As shown in FIGS. 1-5, in addition to the press-type switch mainly composed of the elastic reset member, push rod 7, and automatic retractable and locking mechanism 13 as applied in a ballpoint pen and works in collaboration with the chute 21, the switch assembly may also be implemented in other forms, such as mechanical push switch or toggle switch.

Figure 6:
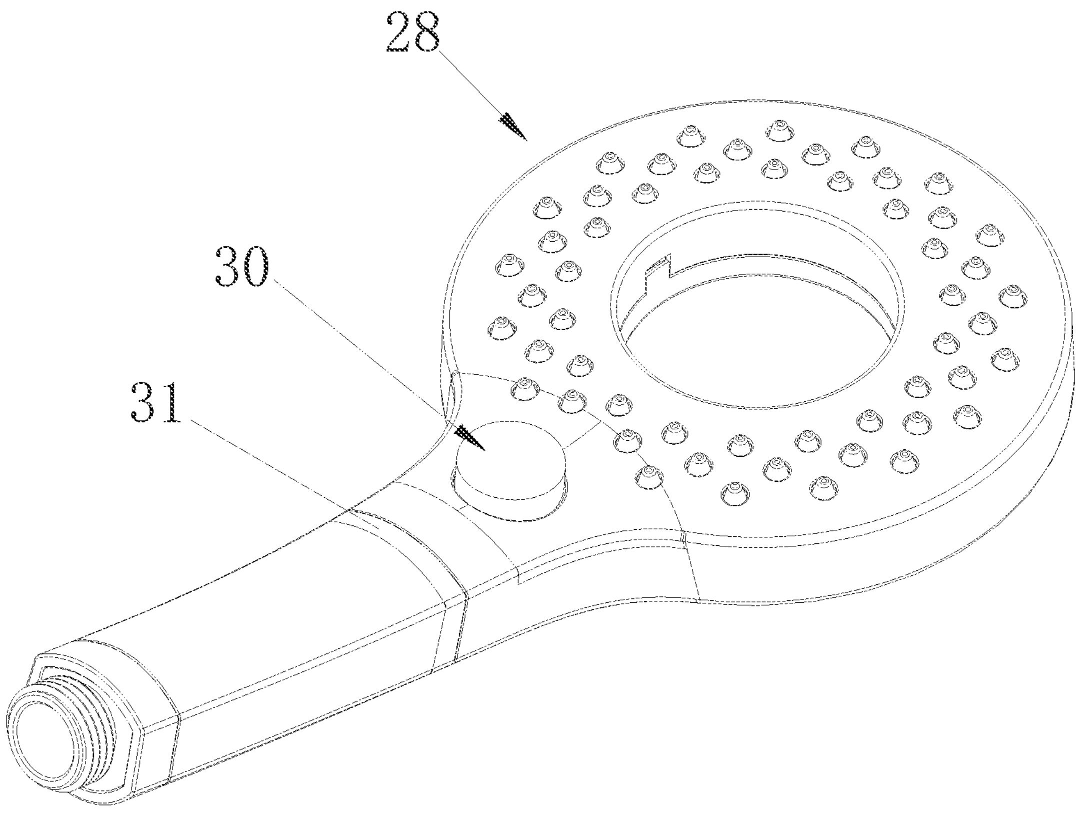
FIG. 6 is a three-dimensional structural schematic diagram of a shower head having the water-stop switch mechanism according to the present disclosure.
Figure 7:
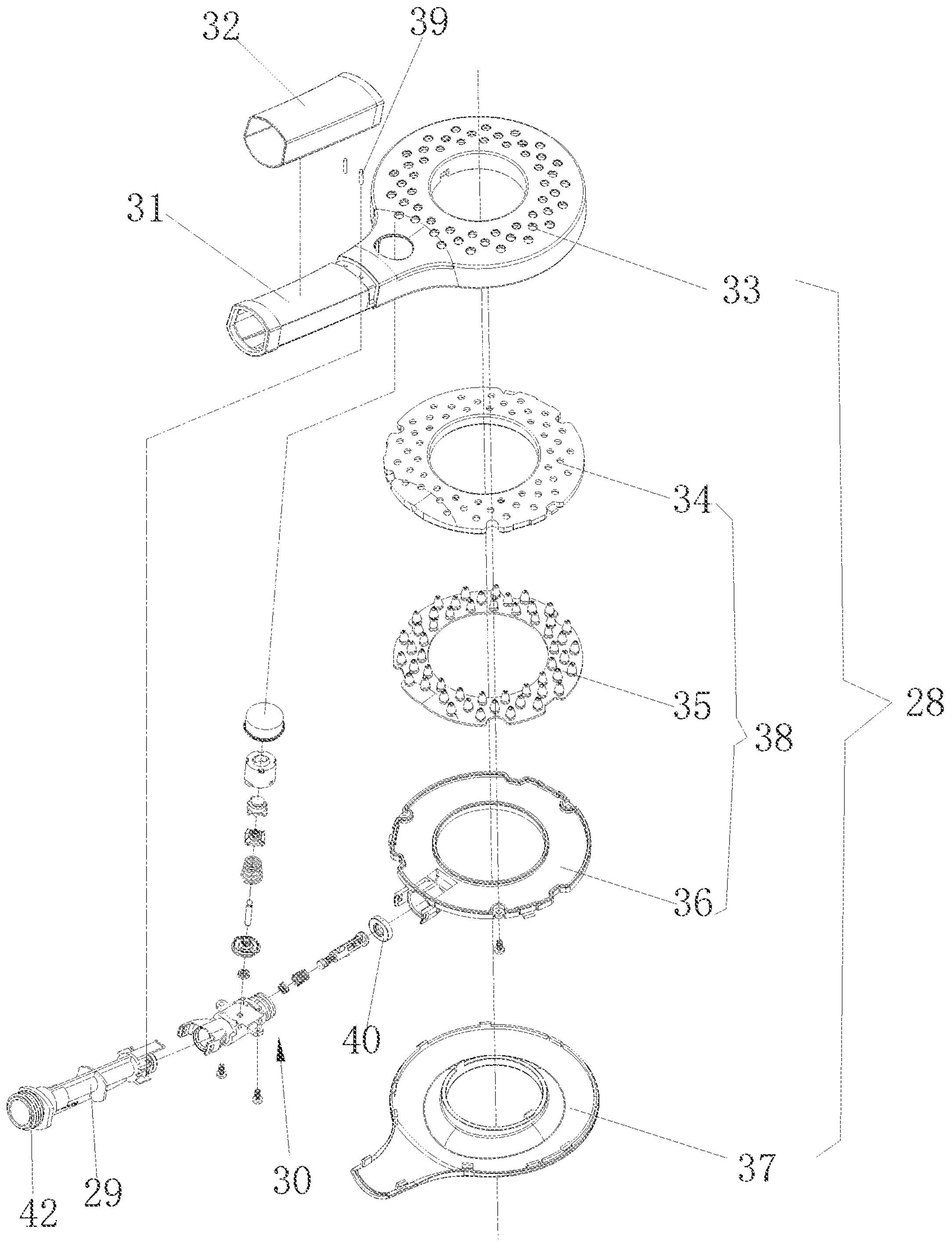
FIG. 7 is an exploded view of the shower head having the water-stop switch mechanism in upside down orientation according to the present disclosure.
Figure 8:
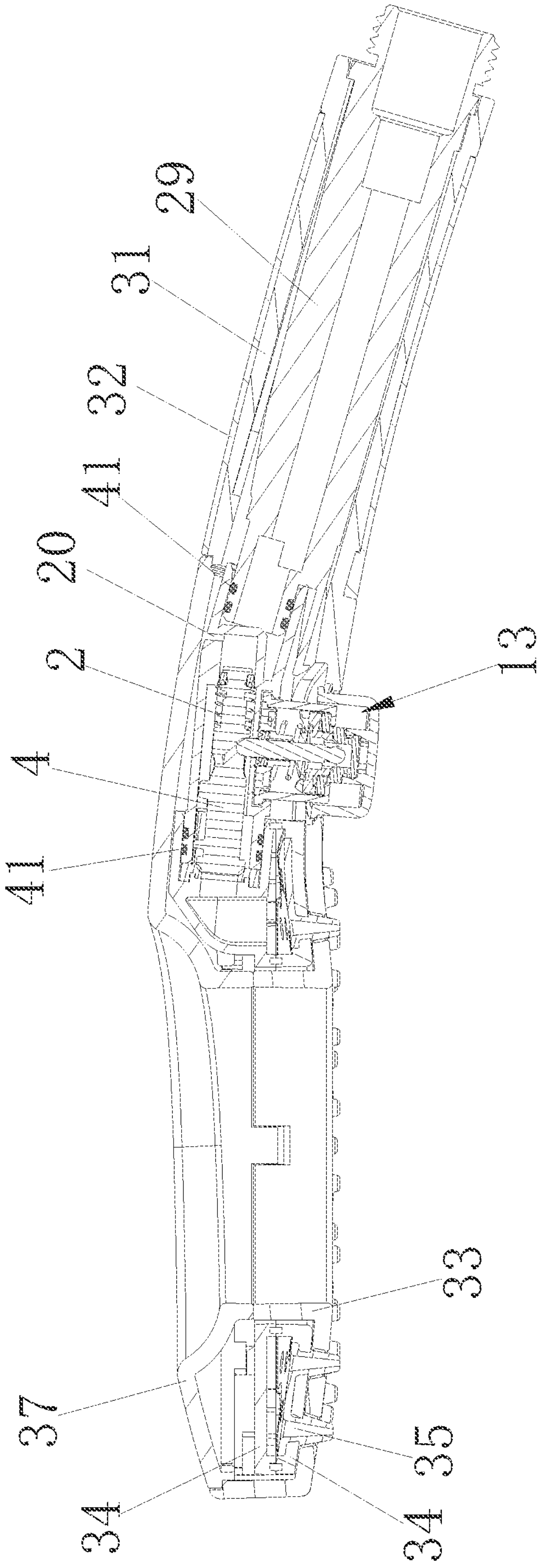
FIG. 8 is a cross-sectional view of the shower head having the water-stop switch mechanism according to the present disclosure.

As shown in FIGS. 1-8, according to another aspect of the present disclosure, a shower head having the water-stop switch mechanism is provided, which includes a shower head main body 28, connection pipe 29, and the water-stop switch mechanism 30 with any one of structures as described above. Specifically, the shower head main body 28 is provided with a handle 31, and the connection pipe 29 and the water-stop switch mechanism 30 are arranged inside the handle 31. Moreover, the water inlet 17 of the water passage pipe 4 communicates with one end of the connection pipe 29, and the other end of the connection pipe 29 extends to the outside of the handle 31 and is provided with a threaded connection section 42. The water outlet 18 of the water passage pipe 4 communicates with the shower head main body 28.

As shown in FIGS. 1-8, specifically, the shower head main body 28 includes an upper decorative shell 37, a water outlet assembly 38 and a lower decorative shell 33 configured with the handle 31. Specifically, the upper decorative shell 37 and the lower decorative shell 33 are engaged with each other, and a water outlet assembly 38 communicating with the water passage pipe 4 is installed between the upper decorative shell 37 and the lower decorative shell 33.

As shown in FIGS. 1-8, more specifically, the water outlet assembly 38 includes a water sealing cover 36, a rubber plate 35 with holes and a water outlet plate 34. The rubber plate 35 with holes is attached to the water outlet plate 34 by glue, and the water sealing cover 36 is sealed and connected to the water outlet plate 34 by soldering or other methods to form a water chamber with a plurality of water outlet holes. Also, the water sealing cover 36 communicates with the water outlet 18 of the water passage pipe 4. In addition, in order to hide the pin shafts 39 provided on the handle 31 for fixing the connection pipe 29, the handle 31 is also provided with a sleeve 32. In addition, since the specific structure and assembly of the upper decorative shell 37, the water outlet assembly 38 and the lower decorative shell 33 are similar to what have already disclosed in the prior art, those skilled in the art can refer to the drawings and the prior art to implement these structures, and the details are described here.

As shown in FIGS. 1-8, a sealing gasket 40 which helps the plug head 23 to block off the water flow is clamped and fixed between the water sealing cover 36 and the water outlet 18 of the water passage pipe 4. In addition, the water passage pipe 4, the water sealing cover 36, and the connection pipe 29 are directly connected to each other by sheathing or snap-fit, and sealing rings 41 are provided at the joints.

The above description only involves some of the specific embodiments of the present disclosure, but the design concept of the present disclosure is not limited thereto, and any non-substantial modification of the present disclosure by using this concept should be considered as falling within the scope of the present disclosure.

What is claimed is:

1. A hydraulically balanced water-stop switch mechanism, comprising a water-stop plug, a water passage pipe and a switch assembly, wherein the water passage pipe comprises an inner pipe and an outer pipe, the outer pipe is sleeved outside the inner pipe, and a water passage is formed between the outer pipe and the inner pipe, a first end of the outer pipe serves as a water inlet, a second end of the outer pipe serves as a water outlet; a first end of the inner pipe proximal to the water outlet is an open end, the water-stop plug is arranged inside the inner pipe and the water-stop plug is movable toward the water outlet, the switch assembly is configured to cause movement of the water-stop plug, a second end of the inner pipe proximal to the water inlet is a closed end, and a sealing ring is provided between the water-stop plug and the inner pipe to form a chamber between the water-stop plug and the closed end so that the rear end of the water-stop plug and the chamber are isolated from the water inlet to prevent water from flowing to the chamber, and a chamber wall is provided with a ventilation hole to introduce atmospheric pressure to the chamber;

wherein the switch assembly comprises a push rod, an automatic retractable and locking mechanism, and an elastic reset member configured to cause the water-stop plug to move toward the water outlet;

the water-stop plug is provided with a chute with a sloping surface, and the push rod is movable toward the chute to drive the water-stop plug away from the water outlet; and the automatic retractable and locking mechanism is configured to cause movement of the push rod.

2. The hydraulically balanced water-stop switch mechanism according to claim 1, wherein the inner pipe and the outer pipe are integrally formed as a single piece.

3. The hydraulically balanced water-stop switch mechanism according to claim 1, wherein two symmetrical water passages are formed between the inner pipe and the outer pipe at left and right sides.

4. The hydraulically balanced water-stop switch mechanism according to claim 1, wherein the water passage pipe is provided with a mounting part, the automatic retractable and locking mechanism comprises a switch cap, an outer shell, a pressing rod, a locking member, and a second compression spring, the pressing rod, the locking member, and the second compression spring are arranged in sequence inside the outer shell;

a first end of the outer shell is connected to the mounting part, the push rod is connected to the locking member, the switch cap is installed on a second end of the outer shell, and the switch cap is connected with the pressing rod.

5. The hydraulically balanced water-stop switch mechanism according to claim 4, wherein the outer shell comprises a guiding cylinder and a cover plate, the cover plate is engaged with the guiding cylinder, and the guiding cylinder is engaged with the mounting part.

6. A shower head having a water-stop switch mechanism, comprising a shower head main body, wherein the shower head main body is provided with a handle;

the water-stop switch mechanism comprises a water-stop plug, a water passage pipe and a switch assembly, wherein the water passage pipe comprises an inner pipe and an outer pipe, the outer pipe is sleeved outside the inner pipe, and a water passage is formed between the outer pipe and the inner pipe, a first end of the outer pipe serves as a water inlet, a second end of the outer pipe serves as a water outlet; a first end of the inner pipe proximal to the water outlet is an open end, the water-stop plug is arranged inside the inner pipe and the water-stop plug is movable toward the water outlet, the switch assembly is configured to cause movement of the water-stop plug, a second end of the inner pipe proximal to the water inlet is a closed end, and a sealing ring is provided between the water-stop plug and the inner pipe to form a chamber between the water-stop plug and the closed end so that the rear end of the water-stop plug and the chamber are isolated from the water inlet to prevent water from flowing to the chamber, and a chamber wall is provided with a ventilation hole to introduce atmospheric pressure to the chamber; and the water-stop switch mechanism is arranged inside the handle;

wherein the switch assembly comprises a push rod, an automatic retractable and locking mechanism, and an elastic reset member configured to cause the water-stop plug to move toward the water outlet;

the water-stop plug is provided with a chute with a sloping surface, and the push rod is movable toward the chute to drive the water-stop plug away from the water outlet; and the automatic retractable and locking mechanism is configured to cause movement of the push rod.

7. The shower head having a water-stop switch mechanism according to claim 6, wherein the shower head further comprises a connection pipe, the connection pipe is assembled inside the handle, a first end of the connection pipe communicates with the water inlet of the water passage pipe, and a second end of the connection pipe extends to the outside of the handle and is provided with a connection part.

* * * * *